Figure 1:
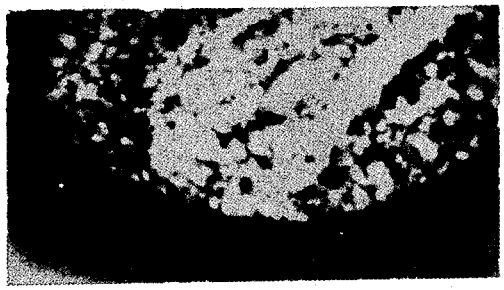

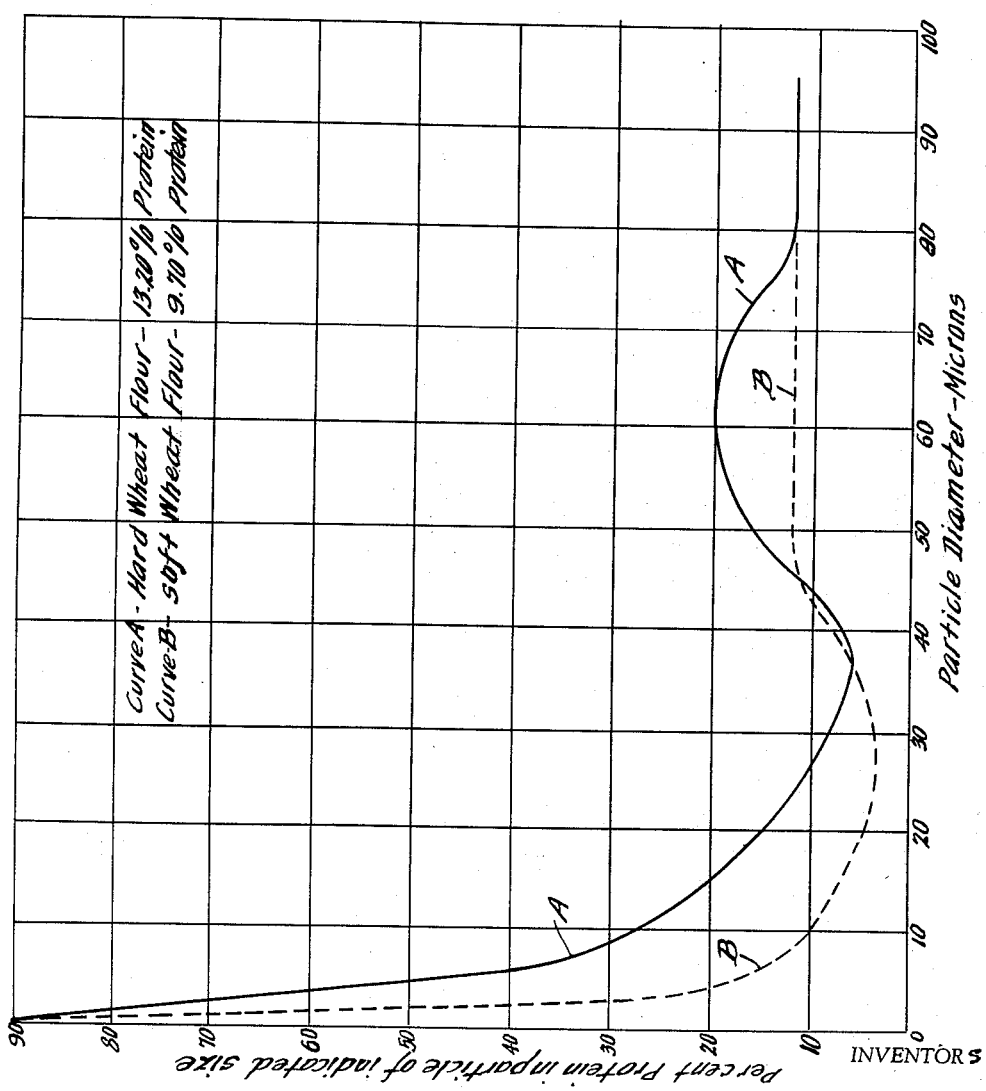

2,957,632
METHOD OF PREPARING PROTEIN RICH FLOUR

Betty J. Sullivan, Minneapolis, Minn., and George F. Dasher, Jr., Cincinnati, Ohio, assignors to Russell-Miller Milling Company, Minneapolis, Minn., a corporation of Delaware Filed Mar. 16, 1956, Ser. No. 573,581

1 Claim. (Cl. 241—5)

This invention relates to wheat flour of enriched gluten content and enhanced baking properties, and to methods for deriving from wheat flour a fraction of substantially increased gluten content.

As is well known, the wheat berry comprises outer layers of hull or husk, which when broken away are called bran, and, encased within the hull, a relatively small germ or embryo, and the endosperm. The endosperm is the major component of the wheat berry and the principal source of the wheat flour, and consists essentially of starch and gluten, a form of protein.

For centuries the traditional milling methods have involved gradual separation of the bran and germ from the endosperm by repeated grinding and sifting, grinding being commonly performed by passing the material between cast iron rolls, usually having corrugated surfaces and rotating at different speeds to afford a shearing action, to produce flour in the form of coarse particles known as middlings. The middlings are treated by a middlings purifier in which an air stream serves to remove the lighter germ and bran particles, leaving very little but the starch and gluten of the endosperm. Finally, the middlings are ground on smooth rolls with a lower differential to the particle size normally encountered in high-grade flour, but without additional separation.

In any given wheat, the endosperm contains less protein than the germ and outer layers or bran, but the protein of the endosperm, referred to herein as gluten, is of much higher quality. A milling process, resulting in a lower grade flour containing more bran and germ, will contain more protein, but because of the poor physical characteristics of the protein of the germ and bran, the resulting flour has inferior dough characteristics and poorer baking quality. Thus in normal milling practice, flour derived from a wheat containing 13% protein may range from 11% to 16% in protein content, but the higher protein flours are of lower grade and not suited for most baking uses. On the other hand, flours of similar grade, contaminated by bran and germ to a comparable extent, will vary in bread-making property with the quantity and quality of the proteins of the endosperm, called gluten.

For the purpose of this application the term "protein" is applied to the nitrogen-containing material in wheat, the amount being determined chemically. Gluten is used to designate the unique protein of flour, which consists almost entirely of the protein of the extracted endosperm. The amount of gluten may be determined by mixing the flour with water, allowing it to stand, and then washing out the starch. The remaining mass is gluten and has characteristic elastic and rubberlike properties; when hydrated, gluten has visco-elastic properties that enable a dough or batter to hold the gas developed by fermentation or chemical leaving agents, resulting in the light porous structure typical of baked goods of high quality. Bread and cake of desirable lightness and volume cannot be produced without the presence of sufficient gluten to form a structural network within the dough or cake batter.

Wheats vary widely in their protein content (from 7% to 20%) and also in the quality of the gluten from the endosperm, depending on climatic conditions encountered during the growth of the plant, soil conditions, damage from insects, fungi, storage and the like.

The protein which is properly designated gluten, found only in the endosperm, is dependent mainly on the original quantity and quality of the gluten of the wheat from which the endosperm is obtained; the amount of gluten can be increased only to a slight extent by lengthening the extraction and further increases in protein are accompanied by corresponding increases in bran or germ contamination in the conventional milling practice. While it has been proposed to enrich certain cereals with gluten obtained from wheat flour by removal of the starch with water, the wet extraction and the subsequent drying usually result in denaturing of the gluten so that its physical characteristics are changed and its baking properties impaired. Increasing the protein content of flour by adding protein rich bran or germ does not, of course, enhance the baking properties since the bran or germ proteins are deficient in this respect.

Heretofore it has been assumed that in flour produced by conventional milling practice the gluten constitutes a matrix in which the starch particles are held. However, it can now be shown that this is probably not the correct view, but that each starch particle is very likely surrounded by a shell or sheath of gluten, the encased particles frequently adhering together in groups or clusters. The essence of the instant invention is the discovery that the milled flour, from which substantially all of the outer hull and germ have been removed, can be treated so as to break away and separate fragments of the gluten sheath encasing the starch particle, whereby a flour rich in gluten may be obtained. This gluten rich flour or concentrate may then be used to enrich flours normally deficient in gluten, or may be employed without such admixture as a gluten rich flour (provided the gluten content is not too high) to produce outstanding improvement in baked goods prepared therefrom. It should be noted that this concept has nothing in common with the so-called "fortification" of protein deficient flours by admixture therewith of a portion of the bran or germ.

The starting material for the process of the invention is the endosperm of the wheat, either in the form of purified flour middlings, i.e. coarse flour, from which the hull and germ have been removed, or in the form of the final high grade flour in which the endosperm has been finely divided, as is customary, but in which the gluten sheath encasing the starch particle is still substantially intact.

In the final stages of grinding the flour, after the bran and germ have been removed, it is customary practice to avoid excessive grinding or harsh treatment, since these tend to produce a flour which is less desirable in baking properties and more subject to enzyme attack. However, we have found that it is possible, without injury to the flour or impairment of its properties, to subdivide a substantial part of the flour into very small particles, of the order of 12 microns or less, and thereby to break the gluten sheath surrounding the starch particles.

The finely divided particles contain a much higher percentage of gluten that is present in the normal finished flour product, and because of the fineness of the particles it is possible to separate them from the remainder, and thus to obtain a flour which is quite rich in protein in the form of gluten. For example, mixed fines ranging from about 3 to 10 microns have been prepared from normal flour of a protein content within the range from 7% to 18%, the fines having a protein content of the order of two to three times that of the flour from which they were derived. A coarser fraction in the range of 5 to 15 microns, derived from a flour having a protein content of about 13%, was found to contain 22% of protein in the form of gluten.

In the preferred practice of our invention, the reduction of a substantial portion of the flour to a range of particle size of 12 microns and less in diameter is effected by impact grinding, which neither impairs the baking characteristics of the flour nor damages the starch providing care is taken that too much heat is not developed. These very fine particles may then be separated from the remainder, as by air classification, to obtain a protein rich fraction and a protein poor fraction. By this method we are enabled not only to isolate a flour rich in gluten, but to achieve, by reason of the smaller particle size, enhanced absorption properties which are obviously advantageous in the bakery.

It is, therefore, a more specific object of the invention to provide a method of preparing an improved flour from purified flour middlings or from flour substantially free of bran and germ, which includes the steps of subjecting the flour to impact sufficient to reduce a substantial portion of the flour to a particle size of the order of 12 microns or less in diameter, and effecting air separation of the reduced particles to obtain a fraction having a substantially greater gluten content than that of the flour from which it is derived.

It will be appreciated that it is immaterial whether process be applied to purified flour middlings or to the or to the flour produced in the usual manner by grinding such middlings; reference herein to treatment of flour in accordance with the invention claimed herein is intended to include, in the absence of qualifying language, the treatment of the purified endosperm component of the wheat berry regardless of the particle size of the material subjected to such treatment. However, since the impact grinding necessary to shatter the gluten sheath effects reduction of size of the flour particles, the starting material is preferably the purified flour middlings, the conventional final grinding of the flour being omitted as unnecessary.

Figure 2:
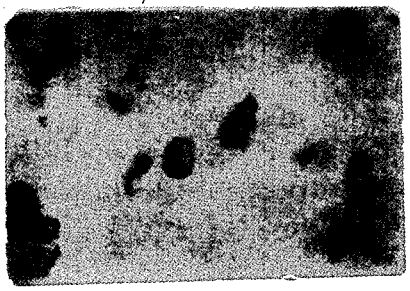
Figure 3:
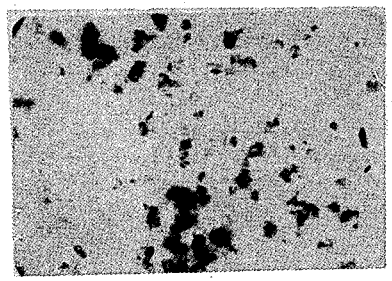
Figure 4:
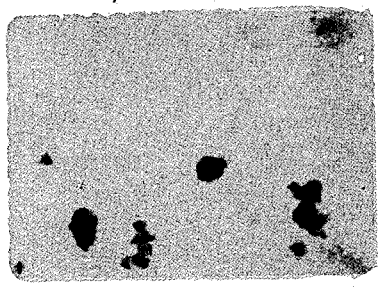
Figure 5:
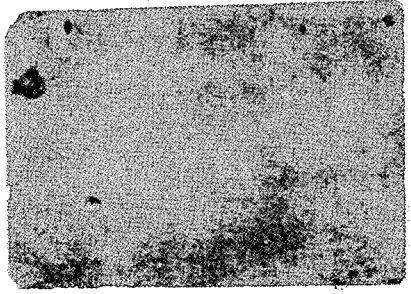

The invention will now be described in more detail by reference to the accompanying drawings, in which Figure 1 is an electron micrograph showing a portion of a normal flour particle in section;

Figures 2 to 5 are photomicrographs, Figures 2 and 4 showing normal flour particles, Figures 3 and 5 showing, respectively, fine and coarse flour particles derived from normal flour particles by the practice of the instant invention; and Figure 6 is a graphic representation of the relation of gluten content to particle size of representative hard wheat and soft wheat flours.

While we do not wish to be bound by any theory offered herein in explanation of the phenomena observed in the practice of our invention, the available evidence affords strong support for the encasement of the starch particle of the endosperm of wheat with a gluten coating of a thickness of the order of less than one micron. Support for this theory is afforded, for instance, by Figure 1 of the drawing, prepared with the aid of an electron microscope at a magnification of 25,000. The photograph shows part of a flour particle which had first been stained with osmium tetroxide, a lipid stain opaque to the electron beam and effective to stain the gluten sheath, which contains a small proportion of lipid. After staining, the flour was embedded in a methacrylate monomer, the monomer was polymerized, sections were obtained by microtoming, and the plastic was then partially dissolved to increase its transparency to the electron beam. The dark portion at the periphery of the particle is due to the presence in the outer gluten sheath of osmium metal from the reduction of the osmium tetroxide. The average thickness of the outer sheath can be estimated from this photograph to be about 0.4 micron; the interior of the particle is principally starch, not substantially effected by the stain.

Figures 2 to 5 lend additional support to the concept which led to the development of the method claimed herein. The photographs, prepared at a magnification of 440 and further enlarged in the drawing to approximately four times their original area, were obtained by staining flour particles with eosine, which is effective to stain protein but not starch. Figure 2 shows normal flour particles; Figure 3 shows fines obtained from the same stained flour sample by impact grinding in a hammer mill of the type shown in the U.S. Patent to Sheldon 2,552,596, granted May 15, 1951, followed by air separation and removal of the coarse particles. It was observed that the fines consist largely of irregular fragments of gluten broken away from the flour particles.

Figure 4 corresponds generally to Figure 2, and shows flour particles prior to treatment in accordance with the invention. Figure 5 is a photograph of the coarse fraction from the same sample, obtained by impact grinding with apparatus of the type shown in the Sheldon Patent 2,552,596, followed by air fractionation. Immediately above the center of each of these figures there appears a particle of generally similar size; the particle in Figure 4 is opaque, since the gluten sheath is intact, whereas the particle in Figure 5 is nearly transparent, indicating that the sheath has been broken away, leaving the unstained starch particle.

Aside from what has been revealed by microscopic examination of the flour particles and of the broken fragments of these particles, it is unquestionably true that when flour substantially free from bran and germ is shattered and separated into the fine and coarse fractions, the former contain a much higher proportion of protein than do the latter. Typical curves are given in Figure 6 to show variation in the percentage of protein with particle diameters expressed in microns, curve A being obtained from hard wheat and curve B from soft wheat. In order to break up the gluten sheath, the flour was in each instance subjected to impact grinding. Particle size determinations were made by the centrifuge sedimentation method described by K. T. Whitby (Heating, Piping and Air Conditioning, pp. 1–7, January 1955 and pp. 139–145, June 1955). By particle size we mean a nominal particle size as determined by rate of sedimentation. Such factors as density differences and differences in shape enter into calculations of particle size based on sedimentation rate. Thus particles larger than 12 microns absolute dimensions may well appear in the nominal less than 12 microns fraction if their density is less than the average density of all particles. Likewise, particles larger than 12 microns absolute dimensions may well appear in the less than 12 microns fraction if irregularly shaped so as to settle more slowly than a sphere of equal density. It is interesting to note that the protein content of particles of the hard wheat flour up to about 40 microns in diameter is in substantial conformity with the theoretical content based on the assumption that the starch particle is generally spherical and is encased in a gluten sheath having a thickness of about 0.4 micron. It will be noted that as the diameter of the particles falls below about 10 microns, the protein content increases rapidly from 20%, reaching nearly 100% at 1 micron diameter or less, as would be expected. It is also of interest to note that in the particle size range of 20 to 50 microns for the hard wheat flour, and 10 to 40 microns for the soft wheat flour, the curves fall substantially below the original protein content; upon further increase of particle size there is a slight rise followed by a resumption of substantially the initial protein content.

It is apparent from these curves that in order to realize a significant increase in protein content, the flour must be reduced in particle size far below that achieved by conventional milling practice, and that reduction to less than 15 microns, and preferably to less than 12 microns in diameter, of a substantial proportion of the flour is needed in commercial practice of the invention, having regard to the increased expense entailed by the added processing steps.

The following examples are merely illustrative of the practice of the invention, it being understood that the scope of the invention is not thereby limited, such procedural variations and modifications being contemplated as would normally occur to those skilled in the art to which the invention relates.

EXAMPLE I

A short patent, hard wheat flour (5 pounds) having 0.39% ash and 12.20% protein was ground in a "pin" or "stud" mill of the type illustrated and described in the U.S. patent to Beushausen et al. 2,712,416, granted July 5, 1955. In this type of mill, impact grinding is effected while the material passes intermeshing studs which are fixed to the faces of a pair of opposed discs, one rotating at a very high speed and the other at a relatively low speed.

The ground flour was then classified in a spiral air classifier such as shown in the U.S. patent to Rumpf et al. 2,694,492, granted November 16, 1954, capable of separating the material into two fractions above and below a predetermined particle size. About 20% of the total sample was recovered as fines; the balance was coarse.

Particle size distribution and protein content for both fractions are given in the following Table I, it being noted that the distribution is expressed as the percentage of particles of less diameter than the corresponding value in the left-hand column of the table.

Table I

| Particle diameter (microns) | Percent by weight of particles of size less than indicated size | | | |
| --- | --- | --- | --- | --- |
| | Original flour | Ground flour from pin mill (one pass) | After separation by air classifier | |
| | | | Fines | Coarse |
| 80 | 78.5 | 99.0 | 99.7 | 99.6 |
| 70 | 62.9 | 97.8 | 99.5 | 98.6 |
| 60 | 47.4 | 96.7 | 99.1 | 96.0 |
| 50 | 37.5 | 92.9 | 98.9 | 90.6 |
| 40 | 28.7 | 86.5 | 98.6 | 80.9 |
| 35 | 25.0 | 81.8 | 98.4 | 73.8 |
| 30 | 22.0 | 73.5 | 98.2 | 64.8 |
| 25 | 18.6 | 67.3 | 98.0 | 52.3 |
| 19 | 9.1 | 44.1 | 97.2 | 25.1 |
| 12 | 3.6 | 20.6 | 65.0 | 4.5 |
| 6 | 1.2 | 6.7 | 16.7 | 0.1 |
| 3 | 0.1 | 0.4 | 1.6 | |
| 1 | | 0.1 | 0.1 | |
| 0.5 | | | | |
| Percent Protein | 12.20 | 12.20 | 19.70 | 10.60 |

EXAMPLE II

The purified patent middlings normally used to make a patent flour and substantially free from bran and germ was employed in this example. The middlings had 12.20% protein.

Forty pounds of the middlings were ground and separated on a vertical hammer mill with a built-in air classifier. Maximum temperature attained during the run was 116° F. The ground material was collected in a single cotton felt cylinder dust collector. This material showed the following particle size distribution.

Table II

| Particle diameter (microns) | Percent by weight greater than specified diameter | Percent by weight less than specified diameter |
| --- | --- | --- |
| 80 | | |
| 60 | 0.2 | 99.8 |
| 40 | 2.4 | 97.6 |
| 30 | 10.8 | 89.2 |
| 25 | 17.2 | 82.8 |
| 19 | 42.8 | 47.2 |
| 12 | 75.7 | 24.3 |
| 6 | 91.0 | 9.0 |
| 3 | 98.6 | 1.4 |
| 1 | | |

The ground sample was then air elutriated to effect a rough separation of the flour into fine and coarse fractions, and the fine fraction separated into further coarse and fine fractions in a more efficient air classifier. The ultimate fines constituted 20% of the original middlings, having a protein (gluten) content of 18%; the corresponding coarse fraction showed 10.30% protein. It is estimated that the difference in protein content of the two fractions would have been substantially greater if some of the very fine particles had not adhered to the separator because of acquisition of static charges.

EXAMPLE III

The same purified middlings employed in Example II were ground in an impact type mill capable of fine grinding of the type shown in Sheldon Patent 2,552,596. The ground material was then subjected to a rough classification in a separator of the "whizzer" type of which the U.S. patent to Crites 2,561,564, granted July 24, 1951, is generally illustrative. Two fractions of generally equal size were obtained. Particle size and protein content are listed in Table III.

Table III

| Particle diameter (microns) | Percent by weight less than indicated size | | | |
| --- | --- | --- | --- | --- |
| | Ground flour from impact mill | Fines from separator 50% | Coarse from separator 50% | Extreme fines by sedimentation |
| 48 | 99.7 | | 99.6 | 99.9 |
| 30 | 97.5 | 99.6 | 94.8 | 99.4 |
| 24 | 91.6 | 96.8 | 80.7 | 98.8 |
| 18 | 72.1 | 86.7 | 50.4 | 97.2 |
| 12 | 46.3 | 58.2 | 22.9 | 93.0 |
| 8 | 32.6 | 40.9 | 14.5 | 82.6 |
| 4 | 10.4 | 12.8 | 4.2 | 28.3 |
| 3 | 3.7 | 5.0 | 1.2 | 11.9 |
| 2 | 0.1 | 0.2 | 1.2 | 1.6 |
| Percent Protein | [1] 12.20 | 15.50 | 10.00 | [1] 87.50 |

[1] Calculated to 14.0% moisture.

The original ground sample was then fractionated by sedimentation in benzene-carbon tetrachloride, specific gravity 1.35–1.39 in which the gluten floats, being lighter than starch. Ninety-three percent (93.0%) of the lighter product had a particle size of less than 12 microns; the product had a protein content of 87.5%, as shown in the last column in Table III.

The invention is not concerned with the details of the apparatus employed to carry out the method; various kinds of apparatus may be employed, as hereinbefore indicated. Experimental data suggests, however, that for effective and practical results the particle size reduction is best effected by equipment of the impact grinding type, and that the separation into fine and coarse fractions, rich and poor, respectively, in protein, is best accomplished by apparatus employing the air classification principle, because of the fineness of particle size involved. In addition to apparatus hereinbefore defined by reference to prior patents, pin or stud mill of the type shown in either of the following U.S. patents may be employed with effective results: Gaffney 2,092,307, granted September 7, 1937 and Lykken 2,304,264, granted December 8, 1942.

It can be shown that the gluten sheath encasing the starch particle is more frangible when dried. For this reason, and also because of the risk of hydrating and denaturing of protein encountered in treatment of flour with aqueous media, it is preferable to avoid the use of water, or an increase in the normal moisture content of flour being treated. The steps of grinding and separation are therefore essentially "dry" processing steps. Separation by water or nonaqueous solvents as previously practiced presents serious obstacles to commercial practice of the invention, and resort to such treatment has been had only for the purpose of determining particle size and protein content in the course of the experimental work. Similar comment may be made with respect to separation by sedimentation, as described in Example III thereof.

It will also be appreciated that for successful commercialization of the invention, the isolation of a substantial part of the ground product of low particle size, for instance at least about 5% by weight of the flour from which it is derived, should be obtained. Consequently, the grinding step should be sufficiently intensive to shatter the gluten sheath in which the starch is encased, and should be continued until gluten fragments constituting at least about 5% by weight of the flour are broken away from the flour particles. So far as is known, no gluten rich concentrate of a substantial portion of purified flour has ever been obtained, either accidentally or intentionally. In other words, the concept of a gluten rich concentrate derived in substantial quantity from a flour substantially free from bran and germ is entirely novel.

It is, of course, desirable to keep the temperature of the flour relatively low in the practice of the invention to avoid damage to its baking qualities. The use of appropriate steps to withdraw heat from the flour during processing is, therefore, contemplated as part of the invention.

Having thus described the invention, what is claimed as new and desired to be secured by Letters Patent is:

In a method of producing a gluten rich flour, the steps which comprise repeatedly striking wheat flour particles to shatter the gluten sheath in which the starch is encased until fragments having a particle size not greater than 15 microns in diameter and constituting at least about 5% by weight of the flour are broken away from the flour particles, and subjecting the material so treated to air currents to separate a portion, at least about 5% by weight, which is relatively rich in gluten with respect to the original flour and in which particles not greater than 15 microns in diameter predominate.

References Cited in the file of this patent

UNITED STATES PATENTS

| | | |
|---|---|---|
| 2,355,028 | Musher | Aug. 1, 1944 |
| 2,464,212 | Carter et al. | Mar. 15, 1949 |
| 2,691,590 | Siefker et al. | Oct. 12, 1954 |
| 2,752,097 | Lecher | June 26, 1956 |

FOREIGN PATENTS

| | | |
|---|---|---|
| 530,390 | Belgium | July 31, 1954 |

OTHER REFERENCES

"Siebel's Manual for Bakers and Millers," 2nd ed., 1924, published by the Siebel Inst. of Tech. (Chicago), pages 92–93.

"Modern Cereal Chemistry," 1947, by Kent-Jones et al., published by the Norther Publishing Co., Ltd. (Liverpool), page 191.

"Cereal Chemistry," vol. 24 (1947), pages 381–393, pages 381–387, relied on.

"Cereal Chemistry," vol. 25 (1948), pages 155–167, pages 159 to 161 relied on.

"Die Muhle," vol. 92, No. 23, June 9, 1955, pages 308–309.

"Anderung von Mehleigenschaften durch Wendsichtung," by Hansen et al., German report on "Internationaler Brotkongress," Hamburg, 1955, pages 154–157. (Translation available, 12 pages.)